(12) United States Patent
Chauvel et al.

(10) Patent No.: US 7,624,382 B2
(45) Date of Patent: Nov. 24, 2009

(54) METHOD AND SYSTEM OF CONTROL FLOW GRAPH CONSTRUCTION

(75) Inventors: Gerard Chauvel, Antibes (FR); Jean-Philippe Lesot, Argentre du Plessis (FR); Gilbert Cabillic, Brece (FR); Mikael Peltier, Bourg-des-Comptes (FR)

(73) Assignee: Texas Instruments Incorporated, Dallas, TX (US)

( * ) Notice: Subject to any disclaimer, the term of this patent is extended or adjusted under 35 U.S.C. 154(b) by 346 days.

(21) Appl. No.: 11/189,367

(22) Filed: Jul. 26, 2005

(65) Prior Publication Data

US 2006/0026571 A1 Feb. 2, 2006

(30) Foreign Application Priority Data

Jul. 27, 2004 (EP) .................................. 04291918

(51) Int. Cl.
*G06F 9/44* (2006.01)
(52) U.S. Cl. ....................................... 717/132; 712/209
(58) Field of Classification Search ................. 712/209; 717/132
See application file for complete search history.

(56) References Cited

U.S. PATENT DOCUMENTS

| | | | |
|---|---|---|---|
| 5,638,525 A * | 6/1997 | Hammond et al. | 712/209 |
| 5,740,461 A * | 4/1998 | Jaggar | 712/41 |
| 5,781,750 A * | 7/1998 | Blomgren et al. | 712/209 |
| 5,875,336 A * | 2/1999 | Dickol et al. | 717/143 |
| 5,889,999 A * | 3/1999 | Breternitz et al. | 717/158 |
| 5,983,337 A | 11/1999 | Mahalingaiah et al. | |
| 6,021,484 A * | 2/2000 | Park | 712/41 |
| 6,233,733 B1 * | 5/2001 | Ghosh | 717/118 |
| 6,260,157 B1 * | 7/2001 | Schurecht et al. | 714/8 |
| 6,298,434 B1 | 10/2001 | Lindwer | |
| 6,412,109 B1 * | 6/2002 | Ghosh | 717/155 |
| 6,480,952 B2 * | 11/2002 | Gorishek et al. | 712/227 |
| 6,691,308 B1 * | 2/2004 | Kasper | 717/168 |
| 6,704,860 B1 * | 3/2004 | Moore | 712/237 |
| 2002/0188825 A1* | 12/2002 | Seal et al. | 712/209 |
| 2003/0126408 A1* | 7/2003 | Vajapeyam et al. | 712/214 |
| 2005/0060696 A1* | 3/2005 | Bicsak et al. | 717/156 |

OTHER PUBLICATIONS

"Bytecode-based Java program analysis"; Don Lance et al.; ACM Southeast Regional Conference Proceedings of the 37th annual Southeast regional conference (CD-ROM) Article No. 14; Year of Publication: 1999; ISBN:1-58113-128-3.*

(Continued)

*Primary Examiner*—Eddie P Chan
*Assistant Examiner*—Keith Vicary
(74) *Attorney, Agent, or Firm*—Ronald O. Neerings; Wade James Brady, III; Frederick J. Telecky, Jr.

(57) ABSTRACT

A method and system to build a control flow graph by execution of micro-sequences using hardware. Some illustrative embodiments are a processor comprising fetch logic that retrieves an instruction from a memory, the instruction being part of a program, and decode logic coupled to the fetch logic which decodes the instruction, wherein the instruction decoded by the decode logic triggers execution of a micro-sequence to enter the instruction in a control flow graph.

24 Claims, 5 Drawing Sheets

OTHER PUBLICATIONS

"Targeting Dynamic Compilation for Embedded Environments"; Michael Chen Kunle Olukotun; Proceedings of the 2nd Java™ Virtual Machine Research and Technology Symposium ;pp. 151-164 ;Year of Publication: 2002 ; ISBN:1-931971-01-3.*

"Constructing control flow graph that accounts for exception induced control flows for Java"; Jang-Wu Jo Byeong-Mo Chang; This paper appears in: Science and Technology, 2003. Proceedings KORUS 2003. The 7th Korea-Russia International Symposium on; Publication Date: Jun. 28-Jul. 6, 2003; vol. 2, On pp. 160-165 vol. 2.*

"Building a Control-flow Graph from Scheduled Assembly Code"; Keith D. Cooper, Timothy J. Harvey, Todd Waterman; Technical Report TR02-399, Rice University, Jun. 2002.*

Lance (Java Program Analysis: A New Approach Using Java Virtual Machine Bytecodes) Dec. 1997.*

* cited by examiner

| | |
|---|---|
| R0 | GENERAL PURPOSE (GP) |
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE /ADDRESS INDEX 0 (AI0) |
| R9 | GENERAL PURPOSE /ADDRESS INDEX 1 (AI1) |
| R10 | GENERAL PURPOSE (GP) |
| R11 | GENERAL PURPOSE (GP) |
| R12 | MICRO-PROGRAM COUNTER (micro-PC) |
| R13 | GENERAL PURPOSE (GP) |
| R14 | GENERAL PURPOSE/INDIRECT REGISTER INDEX (IRI) |
| R15 | STATUS AND CONTROL (ST) — MICRO-SEQUENCE ACTIVE ~198 |

*FIG. 4*

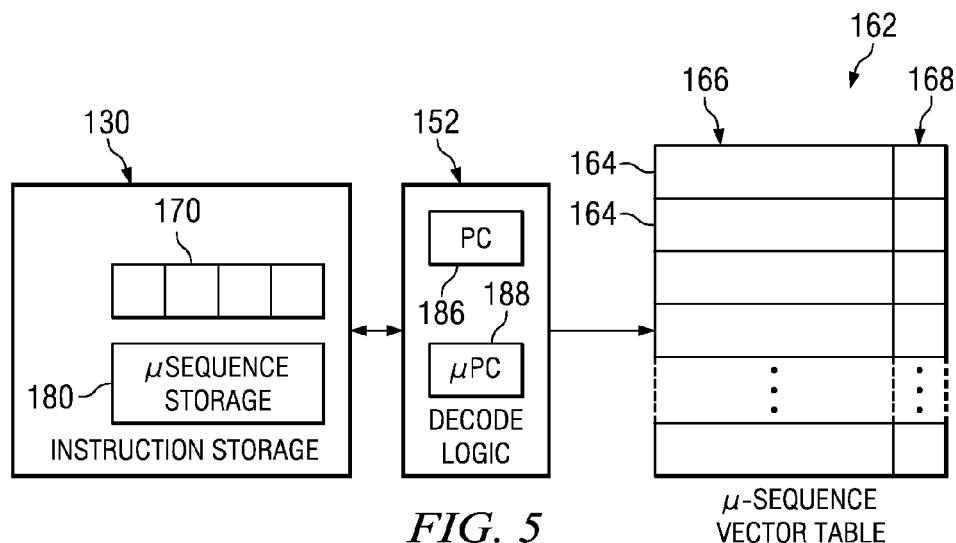

*FIG. 5*

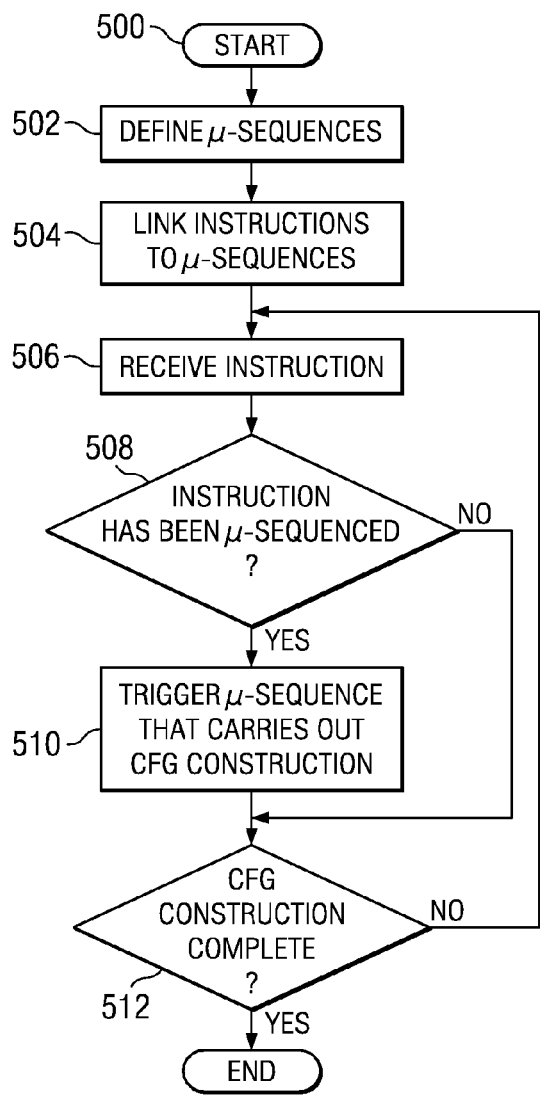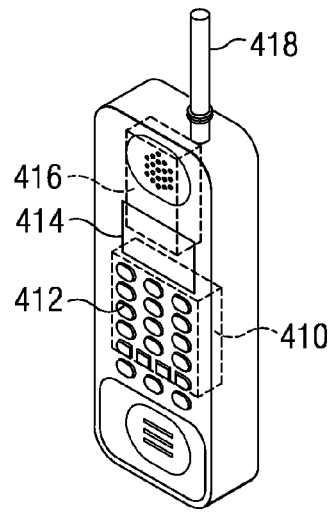

METHOD AND SYSTEM OF CONTROL FLOW GRAPH CONSTRUCTION

CROSS-REFERENCE TO RELATED APPLICATIONS

This application claims priority to EPO Patent Application No. 04291918.3, filed on Jul. 27, 2004, incorporated herein by reference.

BACKGROUND OF THE INVENTION

1. Technical Field of the Invention

Various embodiments of the present disclosure relate to processors and, more particularly, to a method and system of control flow graph construction through integrated hardware resources and software.

2. Background Information

Java™ is a programming language that, at the source code level, is similar to object oriented programming languages such as C++. Java™ language source code is compiled into an intermediate representation based on a plurality "bytecodes" that define specific tasks. In some implementations, the bytecodes are further compiled to machine language for a particular processor. In order to speed the execution of Java™ language programs, some processors are specifically designed to execute some of the Java™ bytecodes directly. Many times, a processor that directly executes Java™ bytecodes is paired with a general purpose processor so as to accelerate Java™ program execution in a general or special purpose machine. Acceleration may also be achieved by optimization of the executable code by way of a compiler.

A control flow graph (CFG) is a data structure used internally by compilers to abstractly represent a procedure or program. Each node in a control flow graph represents a basic block which is a straight-line piece of code with no jumps or jump targets. Edges are used to represent jumps in the control flow. A CFG has an entry block, through which control enters the CFG, and an exit block, through which all control flow leaves. A CFG may be used in the optimization of executable code generated by compilers. For example, a CFG allows a compiler to detect non-syntactical loops and dead code.

FIG. 1A shows an example set of instructions 10. The set of instructions 10 may comprise Java™ opcodes or instructions (including virtual instructions) of any programming language supported by the Java State Machine based on byte. The set of instructions 10 contains one or more leader instructions, indicated in FIG. 1A as references 12, 14, 16, 18, 20, 22, 24, 26, and 28 respectively. A leader instruction is an instruction that starts a basic block in the CFG. A leader instruction may change the flow of control, for example, by starting a catch block; there are, however, instructions that change the control flow and are not leader instructions. Instructions targeted by a conditional branch are leader instructions as well. FIG. 1B illustrates one embodiment of a CFG being an abstract representation of the set of instructions 10. In the CFG, each leader instruction begins a basic block. For instance, in the example illustrated by FIGS. 1A and 1B, the first instruction 12 starts the basic block 30. Instruction 14 starts the basic block 32, instruction 16 starts block 34, and instruction 18 starts block 36. Similarly, instruction 20 starts block 38, instruction 22 starts 40, instruction 24 starts block 42, instruction 26 starts block 44, and instruction 28 starts block 46. The edges connecting the blocks in FIG. 1B represent the control flow from each basic block to other blocks.

A purely software approach to CFG construction has been taken in the related art. Specifically, CFG construction has been done employing the Java Virtual Machine ("JVM") for Java programs. In such an approach, CFG construction may be realized in at least two passes, one to identify leader instructions that start a block in the CFG, and then one or more to create the CFG. The loop that scans the program in a linear fashion to build the CFG increases execution time, unnecessarily ties up processing resources, and consumes power. In the case of an Ahead-in-Time compiler, CFG construction increases the application startup time, while in the case of a Dynamic Adaptive compiler, CFG construction increases the application execution time. Thus, construction of the CFG, while necessary to design and execution of a compiler, introduces undesirable delay.

Thus, there is a need for an efficient approach of integrating hardware and software for CFG construction in object-oriented programming, such as Java.

SUMMARY

The problems noted above are solved in large part by a method and system to build a CFG by combining hardware and software. Some illustrative embodiments are a processor comprising fetch logic that retrieves an instruction from a memory, the instruction being part of a program, and decode logic coupled to the fetch logic which decodes the instruction, wherein the instruction decoded by the decode logic triggers execution of a micro-sequence to construct a control flow graph.

Other illustrative embodiments are a method comprising fetching a first instruction by a fetch logic of a processor, decoding the first instruction by a decode logic, and triggering by the decode logic a series of instructions that construct a control flow graph.

Yet further illustrative embodiments are a system comprising a memory, a first processor, and a second processor coupled to the first processor, the second processor comprising fetch logic that retrieves an instruction from the memory, the instruction being part of a program, and decode logic coupled to the fetch logic, wherein the decode logic decodes the instruction, and wherein the instruction decoded by the decode logic triggers execution of a micro-sequence to construct a control flow graph.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The terms "asserted" and "not asserted" are used herein to refer to Boolean conditions. An asserted state need not necessarily be a logical 1 or a high voltage state, and thus could equally apply to an asserted being a logical 0 or a low voltage state. Thus, in some embodiments an asserted state may be a logical 1 and a not-asserted state may be a logical 0, with de-assertion changing the state from a logical 1 to a logical 0. Equivalently, an asserted state may be a logic 0 and a not-asserted state may a logical 1 with a de-assertion being a change from a logical 0 to a logical 1.

A bytecode, as used herein, refers to a sort of intermediate code that is more abstract than machine code, and may refer to a binary file containing an executable program formed by a sequence of opcode/data pairs. Each instruction has one byte operation code from 0 to 255 which may be followed by parameters such as registers or memory address. The terms "bytecode," "opcode," and instruction are used interchangeably herein.

BRIEF DESCRIPTION OF THE DRAWINGS

For a more detailed description of the preferred embodiments of the present invention, reference will now be made to the accompanying drawings, wherein:

FIG. 4 shows various registers used in the JSM of FIGS. 1 and 2;

FIG. 5 illustrates operation of the JSM to trigger "micro-sequences";

FIG. 6 illustrates a method in accordance with embodiments of the invention; and FIG. 7 depicts an illustrative embodiment of the system described herein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

Moreover, the various embodiments were developed in the context of processors executing Java™ bytecodes, and thus the description is related to the developmental context; however, the various embodiments find application outside the Java environment, such as Microsoft's ".NET" (pronounced "dot net") framework or in programs written in C and C++, and thus the description in relation to a Java environment should not be construed as a limitation as to the breadth of the disclosure.

The subject matter disclosed herein is directed to a programmable electronic device such as a processor. The processor described herein is particularly suited for executing Java™ bytecodes, or comparable code. Java™ itself is particularly suited for embedded applications as it is a relatively "dense" language, meaning that on average each instruction or bytecode may perform a large number of functions compared to other programming languages. The dense nature of Java™ is of particular benefit for portable, battery-operated devices with small amounts of memory. The reason, however, for executing Java™ code is not material to this disclosure or the claims which follow. Further, the processor advantageously has one or more features that permit the execution of the Java™ code to be accelerated.

Figure 1A:
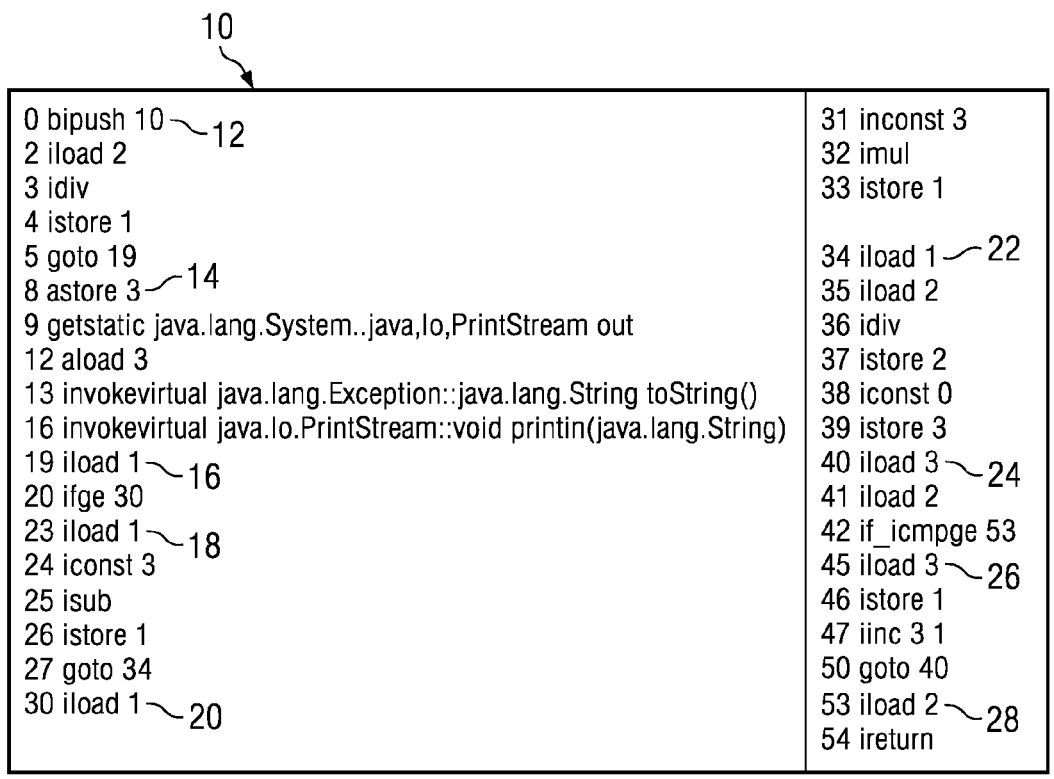
FIG. 1A shows a set of instructions.
Figure 1B:
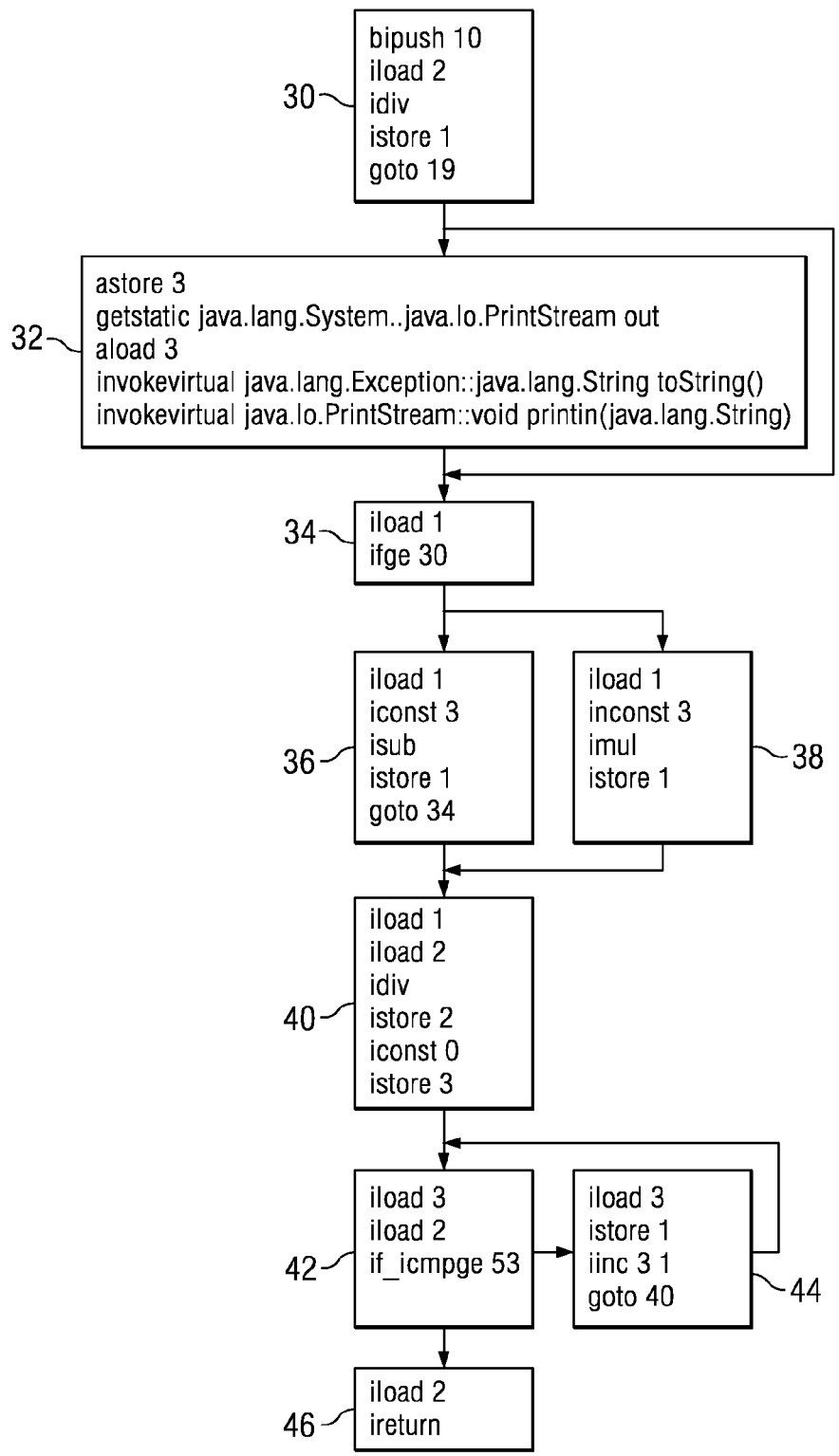
FIG. 1B shows an embodiment of a control flow graph.
Figure 2:
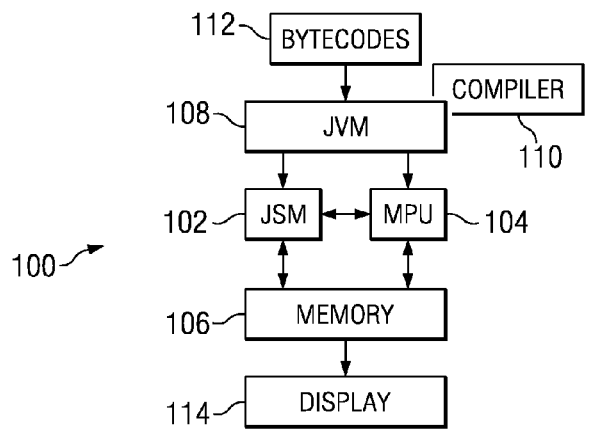
FIG. 2 shows a diagram of a system in accordance with embodiments of the invention.

FIG. 2 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106 coupled to both the JSM 102 and MPU 104. At least a portion of the memory 106 may be shared by both processors, and if desired, other portions of the memory 106 may be designated as private to one processor or the other. System 100 also comprises a Java Virtual Machine ("JVM") 108, compiler 110, and a display 114. The JVM 108 may comprise a combination of software and hardware. The software may comprise the compiler 110 and the hardware may comprise the JSM 102. The JVM may comprise a class loader, bytecode verifier, garbage collector, and a bytecode interpreter loop to interpret the bytecodes that are not executed on the JSM processor 102. Other components (not specifically shown) may be included as desired for various applications.

Java™ language source code is converted or compiled to a series of bytecodes 112, with each individual one of the bytecodes referred to as an "opcode." Bytecodes 112 may be provided to the JVM 108, possibly compiled by compiler 110, and provided to the JSM 102 and/or MPU 104 for execution. In accordance with some embodiments of the invention, the JSM 102 may execute at least some Java™ bytecodes directly. When appropriate, however, the JVM 108 may also request the MPU 104 to execute one or more Java™ bytecodes not executed or executable by the JSM 102. In addition to executing compiled Java™ bytecodes, the MPU 104 also may execute non-Java instructions. The MPU 104 may thus also host an operating system ("O/S") (not specifically shown) which performs various functions such as system memory management, system task management that schedules the software aspects of the JVM 108 and most or all other native tasks running on the system, management of the display 114, and receiving input from input devices (not specifically shown). Java™ code, whether executed on the JSM 102 or MPU 104, may be used to perform any one of a variety of applications such as multimedia, games or web based applications in the system 100, while non-Java™ code, which may comprise the O/S and other native applications, may still run on the system on the MPU 104.

Most Java™ bytecodes perform stack-based operations. For example, an "IADD" (integer add) Java™ opcode pops two parameters (of integer type) off the top of the stack, adds them together, and pushes the sum back on the stack (also of integer type). A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java™ bytecodes, a second instruction set other than Java™ bytecodes. In some embodiments, the second instruction set may comprise register-based and memory-based operations rather than stack-based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions, or stated alternatively Java™ bytecodes may trigger a micro-sequence that executes another set of instructions to perform the function of the particular opcode. The execution of Java™ code may thus be made more efficient and run faster by replacing some opcodes by more efficient micro-sequences of C-ISA instructions. As such, JSM 102 comprises a stack-based architecture for efficient and accelerated execution of Java™ bytecodes, combined with a register-based architecture for executing register and memory based micro-sequences of C-ISA instructions. Because various data structures described herein are JVM-dependent, and thus may change from one JVM implementation to another, the software flexibility of the micro-sequence provides a mechanism for various JVM optimizations now known or later developed.

Figure 3:
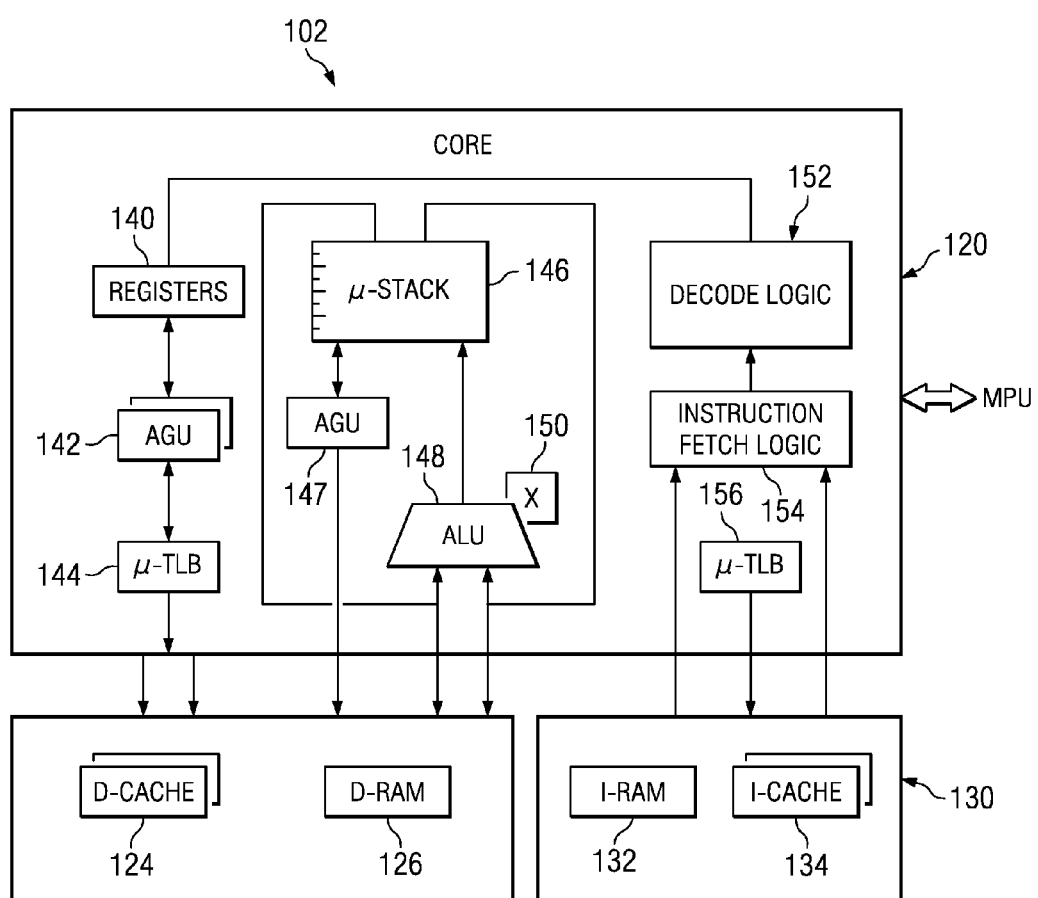
FIG. 3 shows a block diagram of the JSM of FIG. 1 in accordance with embodiments of the invention.

FIG. 3 shows an illustrative block diagram of the JSM 102. As shown, the JSM comprises a core 120 coupled to data storage 122 and instruction storage 130. The components of the core 120 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 122 or from the micro-stack 146, and processed by the ALU 148. Bytecodes may be fetched from instruction storage 130 by fetch logic 154 and decoded by decode logic 152. The AGUs 142 may be used to calculate addresses for C-ISA instructions based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system running on the MPU 104.

Java™ bytecodes may also pop data from and push data onto the micro-stack 146, which micro-stack 146 preferably comprises a plurality of gates in the core 120 of the JSM 102. The micro-stack 146 preferably comprises the top n entries of a larger stack that is implemented in data storage 122. Although the value of n may vary in different embodiments, in accordance with at least some embodiments the size n of the micro-stack may be the top eight entries in the larger, memory-based stack. By implementing the micro-stack 146 hardware in the core 120 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches bytecodes from instruction storage 130, which bytecodes may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java™ mode in which Java™ bytecodes may be decoded, and a C-ISA mode in which micro-sequences of C-ISA instructions may be decoded.

The data storage 122 comprises data cache ("D-cache") 124 and data random access memory ("D-RAM") 126. The stack (excluding the micro-stack 146), arrays and non-critical data may be stored in the D-cache 124, while Java™ local variables, critical data and non-Java™ variables (e.g., C, C++) may be stored in D-RAM 126. The instruction storage 130 may comprise instruction RAM ("I-RAM") 132 and instruction cache ("I-CACHE") 134. The I-RAM 132 may be used for opcodes or micro-sequences, and the I-CACHE 134 may be used to store other types of Java™ bytecode and mixed Java™/C-ISA instructions.

Referring now to FIG. 4, the registers 140 may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for an executing micro-sequence. The use of the PC and micro-PC will be explained in greater detail below. In addition to use as a GP register, register R5 may be used to store the base address of a portion of memory in which Java™ local variables may be stored when used by the current Java™ method. The top of the micro-stack 146 can be referenced by the values in registers R6 and R7, and the top of the micro-stack may have a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IR1"). Register R15 may be used for status and control of the JSM 102. At least one bit (called the "Micro-Sequence-Active" bit, referenced as 198) in status register R15 is used to indicate whether the JSM 102 is executing by way of a micro-sequence. This bit controls in particular, which program counter is used R4 (PC) or R12 (micro-PC) to fetch the next instruction.

FIG. 5 illustrates the operation of the JSM 102 with regard to triggering of micro-sequences based on Java™ bytecodes. In particular, FIG. 5 illustrates the instruction storage 130, the decode logic 152, and a micro-sequence vector table 162. The decode logic 152 accesses the instruction storage 130 and a micro-sequence vector table 162. The decode logic 152 retrieves bytecodes (e.g., bytecode 170) from instruction storage 130 by way of instruction fetch logic 154 (FIG. 2) and decodes the bytecodes to determine the type of bytecode. Upon checking a bit in field 168, indicating that the bytecode has been micro-sequenced, the decode logic 152 references the micro-sequence vector table 162 for the address of the particular micro-sequence in the memory.

The micro-sequence vector table 162 may be implemented in the decode logic 152, or as separate logic in the JSM 102. The micro-sequence vector table 162 preferably comprises a plurality of entries 164, such as one entry for each opcode that the JSM may receive. For example, if there are a total of 256 bytecodes, the micro-sequence vector table 162 preferably comprises at least 256 entries. Each entry 164 may have at least two fields—a field 166 and an associated field 168. Field 168 may comprise a single bit that indicates whether the bytecode 170 is to be directly executed, or whether the associated field 166 contains a reference to a micro-sequence.

For example, a bit in field 168 in its non-asserted state may indicate the corresponding opcode is directly executable by the JSM, and the bit in field 168 in its asserted state may indicate that the associated field 166 contains a reference to a micro-sequence. For purposes of CFG construction the bit in field 168 may be asserted for each bytecode, so that the associated micro-sequence is executed to build the CFG, and once the CFG has been constructed, the bit in field 168 may be reset, not-asserted or asserted for execution procedures, such as those described in U.S. application Ser. No. 10/632,216, filed Jul. 31, 2003, titled "Micro-Sequence Execution in a Processor," incorporated by reference in its entirety.

The micro-sequence vector table 162 may be pre-programmed, or alternatively, may be amenable to modification at any time. In various embodiments, the JVM 108 may write the plurality of micro-sequences based on the opcodes of the set of instructions. The micro-sequences may be pre-programmed, or may be subject to modification by the JVM 108. For instance, a set of micro-sequences might be written to construct the control flow graph, and once the CFG is complete, micro-sequences may be re-written to perform some other function.

If the bit 168 indicates the associated field 166 includes a reference to a micro-sequence, the reference may comprise the full starting address in instruction storage 130 of the micro-sequence, or a part of the starting address that can be concatenated with a base address that may be programmable in the JSM. In the former case, field 166 may provide as many address bits as are required to access the full memory space. In the latter case, a register within the JSM registers 140, or preferably within a JSM configuration register accessible through an indirect addressing mechanism using the IRI register, is programmed to hold the base address. In these embodiments the vector table 162 may supply only the offset to access the start of the micro-sequence. Most or all JSM internal registers 140 and any other registers may be accessible by the MPU 104, and therefore may be modified by the JVM 108 as necessary. Although not required, the offset addressing technique may be preferred to reduce the number of bits needed within field 166. At least a portion 180 of the instruction storage 130 may be allocated for storage of micro-sequences and thus the starting address may point to a location in micro-sequence storage 180 at which a particular micro-sequence can be found. The portion 180 may be implemented in I-RAM 132 shown in FIG. 3.

In operation, the decode logic 152 uses an opcode as an index into micro-sequence vector table 162. Once the decode logic 152 locates the indexed entry 164, the decode logic 152 examines the associated bit 168 to determine whether the opcode triggers a micro-sequence. When the bit 168 indicates that the opcode triggers a micro-sequence, such as during CFG construction, then the decode logic 152 preferably changes the opcode into a "NOP," executes the NOP opcode, asserts the micro-sequence-active bit in the status register R15 (reference 198), and begins fetching the first micro-sequence instruction. Changing the opcode into a NOP while fetching the first instruction of the micro-sequence permits the JSM to process multi-cycle instructions that are further advanced in the pipe without additional latency. The micro-sequence-active bit may be set at any suitable time, such as when the micro-sequence enters the JSM execution stage (not specifically shown).

The JSM 102 implements two program counters—the PC 186 (register R4) and the micro-PC 188 (register R12). In accordance with some embodiments, one of these two program counters is the active program counter used to fetch and decode bytecodes. The PC 186 stored in register R4 may be the active program counter when executing bytecodes. The micro-PC 188 stored in register R12 may be the active program counter when fetching and executing micro-sequences. Setting the status register's micro-sequence-active bit causes the micro-PC 188 (register R12) to become the active program counter instead of the PC 186. Also, the contents of the field 166 associated with the micro-sequenced opcode is loaded into the micro-PC 188. At this point, the JSM 102 begins fetching and decoding the instructions of the micro-sequence. At or about the time the decode logic begins using the micro-PC 188 from register R12, the PC 186 preferably is incremented by a suitable value to point the program counter to the next bytecode following the opcode that triggered the micro-sequence. In at least some embodiments, the micro-sequence-active bit within the status register R15 may be changed when the first instruction of the micro-sequence enters the execute phase of JSM 102 pipe. The switch from PC 186 to the micro-PC 188 preferably is effective immediately after the micro-sequenced bytecode is decoded, thereby reducing the latency.

The micro-sequence may perform any suitable task, such as CFG construction, and then end with a predetermined instruction from the C-ISA called "RtuS" (return from micro-sequence) that indicates the end of the sequence. This C-ISA instruction causes a switch from the micro-PC (register R12) to the PC (register R4). Preferably, the PC 186 was previously incremented so that the value of the PC 186 points to the next bytecode to be decoded.

Examples of micro-sequences for detection of leader instructions, as may be employed according to various embodiments of the present disclosure, are found in Table 1 expressed in pseudo-code form. Micro-sequences, such as those shown in Table 1 for NOP and Astore, may mark bytecodes that are not the target of a branch, but which are nevertheless a leader. For example, an bytecode that starts a catch block would be marked as a leader by the micro-sequence for "NOP" or "Astore." Micro-sequences, such as that shown in Table 1 for "Goto," may mark the target of an unconditional branch as a leader. Micro-sequences such as those shown in Table 1 for "if_icmpge" and "ifge," may mark the target of a conditional branch and the following bytecode as leaders. Similar micro-sequences may be written for all possible bytecodes.

TABLE 1

| Instruction | Micro-sequence |
| --- | --- |
| NOP | if PC start a catch block in exception table |
|  | leaderList.add(PC) |
| Astore | if PC start a catch block in exception table |
|  | leaderList.add(PC) |
| Goto | offset = instruction operand |
|  | targetPC = PC + offset |
|  | leadList.add(targetPC) |
| If_icmpge | offset = instruction operand |
|  | Target PC = offset + PC |
|  | Following PC = PC + instruction size |
|  | leaderList.add(TargetPC) |
|  | leaderList.add(Following PC) |
| Ifge | offset = instruction operand |
|  | Target PC = offset + PC |
|  | Following PC = PC + instruction size |
|  | leaderList.add(TargetPC) |
|  | leaderList.add(Following PC) |

Additionally, various micro-sequences may be written for CFG construction, as shown in pseudo-code form in Table 2, and the micro-sequences are then stored in micro-sequence storage 180. For example, for bytecodes that can potentially trigger an exception, an edge into the CFG may be created between the current block containing the instruction and the block managing the exception, as shown by example in the micro-sequence in the first row of Table 2. This first micro-sequence may be used by other micro-sequences, including the micro-sequences that manage other bytecodes that may trigger an exception, such as that shown for "idiv." For bytecodes that do not break the control flow, such as "idiv," the micro-sequence may check to see if the bytecode is a leader or not. If the bytecode is not a leader, it is added to the current basic block in the CFG, otherwise, there is a check performed to see if a new node may be created and what edges are needed between basic blocks. A micro-sequence for bytecodes that break the control flow in an unconditional manner is shown in the Table, by example, as for the instruction "goto," and a micro-sequence that manages bytecodes that break the control flow in a conditional manner is shown in the final row of Table 2, by example, as for the instruction "ifeq." Such micro-sequences create blocks, create edges connecting blocks, and place bytecodes in existing blocks. Similar micro-sequences may be written for all possible bytecodes. The example micro-sequences of Tables 1 and 2 as well as many other possible micro-sequences not specifically described herein, may be combined in various embodiments in order to carry out the steps of CFG construction in a single pass. Similarly, a new micro-sequence may be defined to build the CFG in a single pass.

instructions, and the micro-sequences are then stored in the micro-sequence memory 180. Additionally, multiple micro-sequences, such as those described by example in Tables 1 and 2 as well as many other possible micro-sequences not specifically described herein, may be combined into a single micro-sequence as is desirable to complete CFG construction in a single pass. Similarly, a new micro-sequence may be defined to build the CFG in a single pass.

With micro-sequences for CFG construction stored in the micro-sequence memory 180, the process then links byte-codes with micro-sequences in the micro-sequence vector table (block 504). Each bytecode may be linked to a micro-sequence that carries out CFG construction for that particular bytecode, such as identifying whether it is a leader instruction, and if so, creation of a new basic block and/or new edges connecting blocks on the CFG. The micro-sequence vector table acts as an index between possible bytecodes and the

TABLE 2

| Instruction | Micro-sequence |
|---|---|
| Instructions that can potentially trigger an exception | If instruction inside a try block { <br>     If BrInPast.containsKey(PC catch block) <br>         Edge between current Node & BrInPast.get(PC) <br> } <br> BrInFuture.put(PC catch block, current Node) |
| idiv | If LeaderList. contains (instruction) { <br>     If not current Basic Block instructionList is Empty( ) { <br>         Temp = new Basic Block <br>         Link between current Basic Block & Temp <br>         Current Basic Block = temp <br>     } <br>     If BrInFuture.contains Key(instruction) <br>         Edge between BrInFutur.get(instruction) & currentNode <br>     Else BrInFuture(targeted PC, current Basic Block <br> } <br> Current Basic Block instructionList.add(instruction) |
| bispush | If LeaderList. contains (instruction) { <br>     If not current Basic Block instructionList is Empty( ) { <br>         Temp = new Basic Block <br>         Link between current Basic Block & Temp <br>         Current Basic Block = temp <br>     } <br>     If BrInFuture.contains Key(instruction) <br>         Edge between BrInFutur.get(instruction) & currentNode <br> } <br> Else BrInFuture(targeted PC, current Basic Block <br> Current Basic Block instructionList.add(instruction) |
| Goto | currentBasicBlock.instructionList.add(instruction) <br> if BrInPast.containsKey(targeted PC) <br>     Edge between currentBasicBlock & BrInPast.get(targeted PC) <br> else BrInFuture(targeted PC, current Basic Block) <br> Current Basic Block = new Basic Block |
| IFEQ | Current Basic Block instructionlist.add(instruction) <br> If BrInPast contains Key(targeted PC) <br>     Edge between currentBasicBlock & BrInPast.get(targeted PC) <br> Else BrInFuture (targeted PC, current Basic Block) <br> Old Basic Block = current Basic Block <br> Current Basic Block = new Basic Block <br> Link between old Basic Block and current Basic Block |

FIG. 6 illustrates a flow diagram of a method in accordance with embodiments of the invention. In particular, FIG. 6 illustrates a process that may be implemented, at least in part, by the decode logic 152. The process starts (block 500) and then defines one or more micro-sequences for CFG construction (block 502). The micro-sequences for CFG construction may be written ahead of time, and the JVM 108 may be employed to read the micro-sequences for CFG construction, put them in micro-sequence memory 180 accessible to the JSM, and update the vector table accordingly. For instance, various micro-sequences may be written to detect leader micro-sequences written during block 502. In the course of creating a CFG for entire program, a particular opcode may be encountered multiple times.

The process receives an bytecode (block 506). The byte-code may be fetched by the JSM 102. Then the bit 168 is checked for whether it indicates that the associated bytecode has been micro-sequenced, which may be true during the pass(es) for building the CFG (block 508). If during the check of block 508 the bit 168 indicates that the associated bytecode has been micro-sequenced, the micro-sequence located in the address referenced by the associated field 166 is triggered (block 510), and is executed by the JSM, carrying out CFG construction for the bytecode. The micro-sequence will enter the associated bytecode in the CFG. Then a check is done to indicate whether CFG construction is complete (block 512). Specifically, the check of block 512 may be performed inside a micro-sequence. If CFG construction is complete, the process ends. If CFG construction is not complete, another bytecode is received (block 506), and the process repeats until the CFG is completed. If the bit 168 does not indicate that the associated bytecode has been micro-sequenced (block 508), the process proceeds to check if the CFG construction is complete (block 512).

When construction of the CFG is complete, actual execution of the bytecodes may follow. Discussion of execution of these bytecodes is not material to this disclosure, except to note that when CFG construction is completed, the JVM may re-write the micro-sequences as necessary to carry out tasks other than CFG construction, and set or reset the bit 168 for each opcode accordingly. After CFG construction is complete, the bytecodes may be executed, either directly or via various micro-sequences written to carry out tasks other than CFG construction.

System 100 may be implemented as a mobile cell phone such as that shown in FIG. 7. As shown, the mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Each and every claim is incorporated into the specification as an embodiment of the present invention.

What is claimed is:

1. A processor, comprising:
fetch logic configured to retrieve a plurality of instructions from a memory, wherein the plurality of instructions are from a first native instruction set of the processor; and
decode logic coupled to the fetch logic, wherein the decode logic is configured to decode the plurality of instructions,
wherein the processor is configurable to execute the plurality of instructions and to construct a control flow graph for the plurality of instructions,
wherein when the processor is configured to construct the control flow graph, each instruction in the first native instruction set of the processor is associated with a micro-sequence configured to generate a portion of the control flow graph corresponding to the instruction and the decode logic, responsive to decoding each instruction in the plurality of instructions, causes the micro-sequence associated with each instruction in the plurality of instructions to be executed, wherein the control flow graph is constructed, and
when the processor is configured to execute the plurality of instructions, each instruction in a subset of the first native instruction set is associated with a micro-sequence configured to perform a function of the instruction and the decode logic causes each instruction in the plurality of instructions to be executed, wherein when the micro-sequence is associated with the instruction, the micro-sequence is executed to perform the function of the instruction,
wherein a micro-sequence is one or more instructions from a second native instruction set of the processor.

2. The processor of claim 1, further comprising:
a vector table accessible by the decode logic, wherein the vector table comprises an entry for each instruction in the first native instruction set,
wherein when the processor is configured to construct the control flow graph, the vector table is used to associate each instruction in the first native instruction set with the micro-sequence configured to generate the portion of the control flow graph corresponding to the instruction, and
when the processor is configured to execute the plurality of instructions, the vector table is used to associate each instruction in the subset of instructions with the micro-sequence configured to perform the function of the instruction.

3. The processor of claim 2, wherein when a micro-sequence is associated with an instruction, the entry for the instruction references a location in the memory in which the micro-sequence is stored.

4. The processor of claim 1, wherein a compiler is configured to cause configuration of the processor to construct the control flow graph.

5. The processor of claim 1, wherein a micro-sequence configured to generate a portion of the control flow graph identifies whether an instruction is a leader instruction.

6. The processor of claim 1, wherein a micro-sequence configured to generate a portion of the control flow graph identifies whether an instruction is a non-leader instruction.

7. The processor of claim 1, wherein the control flow graph is constructed in a single pass.

8. The processor of claim 1, wherein the control flow graph is constructed in more than one pass.

9. A method for constructing a control flow graph for a plurality of instructions, comprising:
configuring a processor to construct the control flow graph instead of executing instructions in a first native instruction set of the processor, wherein configuring comprises associating each instruction in the first native instruction set of the processor with a micro-sequence configured to generate a portion of the control graph corresponding to the instruction;
responsive to fetching and decoding each instruction in the plurality of instructions, executing the micro-sequence associated with the instruction, wherein the control graph is constructed; and
reconfiguring the processor to execute instructions in the instruction set after the control graph is constructed, wherein reconfiguring comprises associating each instruction in a subset of the first native instruction set with a micro-sequence configured to perform a function of the instruction, wherein all other instructions in the first native instruction set are executed directly by the processor,
wherein a micro-sequence is one or more instructions from a second native instruction set of the processor.

10. The method of claim 9, wherein
associating each instruction in the first native instruction set further comprises placing a reference to the micro-sequence in an entry of a vector table, wherein the vector table comprises an entry for each instruction in the first native instruction set, and
fetching and decoding further comprises accessing the vector table to locate the micro-sequence.

11. The method of claim 9, wherein executing the micro-sequence further comprises:
   adding the instruction to a current block of the control flow graph when the instruction is a non-leader instruction, wherein the current block is one of one or more existing blocks in the control flow graph.

12. The method of claim 9, wherein executing the micro-sequence further comprises:
   adding the instruction to a new block in the control flow graph when the instruction is a leader instruction; and
   linking the new block to existing blocks in the control flow graph.

13. The method of claim 11, wherein executing the micro-sequence further comprises adding a target of an unconditional branch to a new block of the control flow graph.

14. The method of claim 11, wherein executing the micro-sequence further comprises adding a target of a conditional branch to a new block of the control flow graph.

15. The method of claim 11, wherein executing the micro-sequence further comprises adding a start of a catch block to a new block of the control flow graph.

16. The method of claim 9, wherein the control flow graph is constructed in a single pass.

17. The method of claim 9, wherein the control flow graph is constructed in more than one pass.

18. A system, comprising:
   a memory;
   a first processor; and
   a second processor coupled to the first processor, the second processor comprising:
      fetch logic configured to retrieve a plurality of instructions from the memory, wherein the plurality of instructions are from a first native instruction set of the second processor; and
      decode logic coupled to the fetch logic, wherein the decode logic is configured to decode the plurality of instructions,
      wherein the second processor is configurable to execute the plurality of instructions and to construct a control flow graph for the plurality of instructions,
      wherein when the second processor is configured to construct the control flow graph, each instruction in the first native instruction set of the second processor is associated with a micro-sequence configured to generate a portion of the control flow graph corresponding to the instruction and the decode logic, responsive to decoding each instruction in the plurality of instructions, causes the micro-sequence associated with each instruction in the plurality of instructions to be executed, wherein the control flow graph is constructed, and
      when the second processor is configured to execute the plurality of instructions, each instruction in a subset of the instruction set is associated with a micro-sequence configured to perform a function of the instruction and the decode logic causes each instruction in the plurality of instructions to be executed, wherein when a micro-sequence is associated with the instruction, the micro-sequence is executed to perform the function of the instruction,
      wherein a micro-sequence is one or more instructions from a second native instruction set of the second processor.

19. The system of claim 18, wherein the second processor further comprises:
   a vector table accessible by the decode logic, wherein the vector table comprises an entry for each instruction in the first native instruction set,
   wherein when the second processor is configured to construct the control flow graph, the vector table is used to associate each instruction in the first native instruction set with the micro-sequence configured to generate the portion of the control flow graph corresponding to the instruction, and
   when the second processor is configured to execute the plurality of instructions, the vector table is used to associate each instruction in the subset of instructions with the micro-sequence configured to perform the function of the instruction.

20. The system of claim 19, wherein when a micro-sequence is associated with an instruction, the entry for the instruction references a location in the memory in which the micro-sequence is stored.

21. The system of claim 18, wherein a micro-sequence configured to generate a portion of the control flow graph identifies whether an instruction is a leader instruction.

22. The system of claim 18, wherein a micro-sequence configured to generate a portion of the control flow graph identifies whether an instruction is a non-leader instruction.

23. The system of claim 18, wherein the control flow graph is constructed in a single pass.

24. The system of claim 18, wherein the control flow graph is constructed in more than one pass.

* * * * *

UNITED STATES PATENT AND TRADEMARK OFFICE
CERTIFICATE OF CORRECTION

PATENT NO. : 7,624,382 B2
APPLICATION NO. : 11/189367
DATED : November 24, 2009
INVENTOR(S) : Chauvel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Twenty-sixth Day of October, 2010

David J. Kappos
*Director of the United States Patent and Trademark Office*